Figure 1:
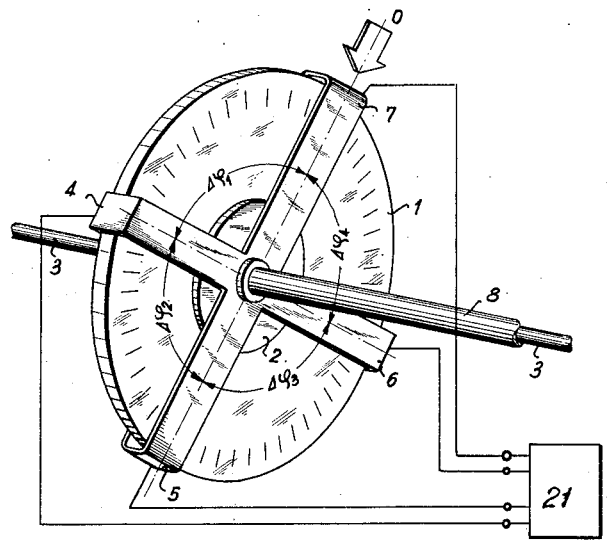

June 5, 1962     G. SEIFFERT     3,038,152

SCALE READING APPARATUS

Filed Sept. 23, 1958

INVENTOR
Georg Seiffert.

By: Samuel W. Kipnis
Atty.

United States Patent Office 3,038,152
Patented June 5, 1962

3,038,152
SCALE READING APPARATUS
Georg Seiffert, Berlin-Neukolln, Germany, assignor to Askania-Werke A.G., Berlin-Friedenau, Germany, a corporation of Germany
Filed Sept. 23, 1958, Ser. No. 762,846
Claims priority, application Germany Sept. 27, 1957
3 Claims. (Cl. 340—347)

This invention relates to apparatus for reading scales such as those marked on the horizontal and vertical circles of theodolites, cinetheodolites and the like. The invention relates particularly to an automatic, digital scale reader, wherein scale intervals are counted rather than measured.

Fundamentally, "digital" or counting arrangements as well as "analogue" or measuring determinations are well known in a variety of arts. In a broad sense there is always some standard, forming a scale or comparable to a scale, which gives occasion to the counting of intervals, in the digital method, the counting being generally performed by photoelectric devices movable relative to the standard. Such digital reading is preferred in many occasions where reading and/or regulating operations are to be performed automatically or objectively.

The need for such operations has been noted for instance in connection with cinetheodolites and the like; and in this connection, special opportunities for further improvements have now been discovered. These relate particularly, although not exclusively, to cinetheodolite circles and the like whereon measurement values are marked by radial divisions, as has been usual for a long time. Such marking is also desirable when read by objective scanning means; this is so for a variety of reasons, including among others the difficulty of providing sufficient numbers of markings when truly digital marks are already applied to the circle itself. Evidently the precision of measurements depends very largely on the number of markings applied on the circle, it being desired that the smallest interval of subdivision be smaller than the limit of measuring accuracy to be obtained.

On the other hand, considerable difficulties are encountered when an attempt is made to fabricate graduated circles wherein the above discussed requirements are utilized to the fullest extent theoretically possible. The reason is that each application of a mark is an operation subject to error, and the control of such errors becomes very laborious when carried out to the fullest extent, for instance when dividing a circle into finely subdivided angular seconds.

In connection with problems of this type various proposals have been made, contemplating for instance a combination of a relatively coarsely subdivided scale with a more finely subdivided screen, disposed at a position more or less spaced from the primary scale and subdividing the primary division. If such is done in connection with automatic devices of the photoelectric type major, divisions successively pass the intervals of the finer subdivision for releasing coincidence impulses, which are then fed to a counting system or the like. Such prior devices, however, have very limited applicability. For one thing, they cannot be readily applied to magnetic scales, as it is impossible to find room for the required number of magnetic heads to cooperate with the fine screen, within the limited scope of a primary division. Additionally, the indicated use of a primary circle and finer screen is subject to the occurrence of graduating errors on the scale itself and of uncontrollable errors of adjustment and centering in the circle, fine screen, and associated devices. Also, when finely divided main graduations are combined with still finer screens, extreme counting frequencies are likely to occur, which can be handled but only with rather expensive electrical apparatus.

It is the object of this invention to overcome these difficulties; and this has been achieved by an arrangement which can be briefly described as comprising; a circle marked in a relatively coarse way, by optically, magnetically or otherwise effective marks, such as radial lines; the circle being adapted to be moved relative to a reading or scanning system which contains a plurality of scanning devices, displaced relative to one another about the circle by more than the width of one of the relatively coarse intervals and by more than an integral multiple of one such width. The scanning system cooperates with the circle to produce successive counting pulses which do not coincide in time and which functionally subdivide the reading of each of the relatively coarse markings.

It has further been found that by means of such a system, and without further provision or expense, the further advantage is obtained that errors of the circle itself [such as the so-called periodic error, caused by the circle graduating machine] no longer affect the measurement of the theodolite or similar device. The invention also eliminates other errors [such as those caused by eccentricity of circle and circle carrier, eccentricity of circle and scanning means, etc.] Still further, as already suggested, the system according to the invention has particular advantages where magnetic divisions are employed.

Figure 2:
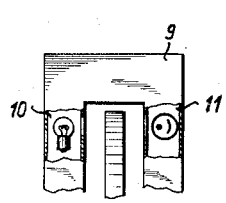
Figures 4, 5:
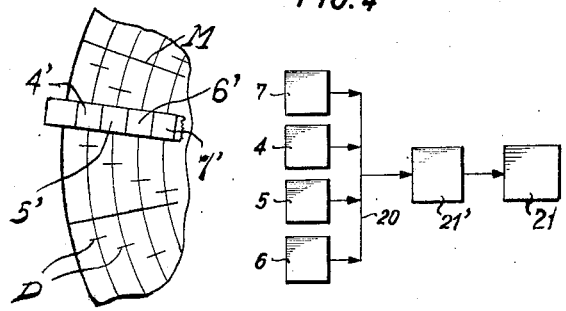
Figure 3:
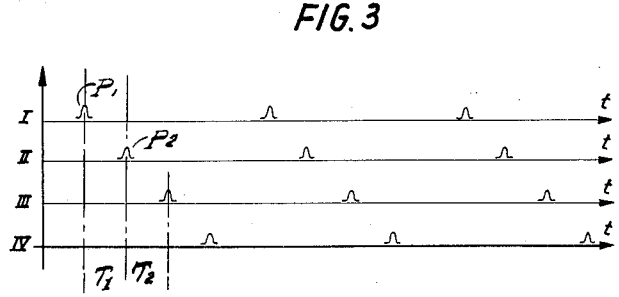

In the drawing: FIGURE 1 is a perspective, schematic view of an embodiment of the invention. FIGURE 2 is a fragmentary end view of a detail from the apparatus of FIGURE 1, modified in certain respects. FIGURE 3 is a graphic representation of pulse sequences obtained with such apparatus. FIGURE 4 is a block diagram schematically representing a modification of FIGURE 1; and FIGURE 5 is a front view of a further modification of the apparatus of FIGURE 1.

Referring to FIGURE 1: theodolite altitude circle 1 is rigidly connected, by holder 2, with theodolite altitude shaft 3, which is also secured to the theodolite telescope [not shown], so that circle 1 shares all vertical movements of the telescope. Incident to such movements, circle 1 moves relative to a system of scanning devices, schematically shown in form of four scanners 4, 5, 6 and 7. The scanning system is rigidly secured to a hollow shaft 8 coaxial with cinetheodolite shaft 3 and stationarily mounted. Scanners 4, 5 etc. are spaced from one another by angles equally any integral multiple of the spacing between two graduations of circle 1 plus a certain addendum; such angles being indicated as covering about 90 degrees, subject to various modifications and mainly subject to the inclusion of said addenda.

Circle 1 has graduations, as schematically shown, which in the present case may be assumed to be magnetic marks formed in a suitable surface portion of the circle. As a result the actual graduations are of course invisible; their showning in FIGURE 1 is purely schematic. Scanning devices 4, 5, 6 and 7 contain magnetic heads which may for instance have similarity with those used in phonographic tape readers and the like. As circle 1 moves incident to the operation of the cinetheodolite, and as it accordingly performs successive, unidirectional or bidirectional, slow or rapid movements, the graduations pass the scanning devices, each graduation releasing a counting impulse in each device. The sum total of the impulses emitted by scanners 4, 5, 6 and 7, for instance upon a clockwise shift of circle 1, can be counted in known manner by a counting device 21, and because of the above mentioned angular spacing between the scanning heads, including said addenda to the integral multiples of graduation spaces, it will be found that at the exact moment when one mark passes the first scanning head 4, the other marks do not pass the other heads 5, 6 and 7 yet;

they pass them at slightly different times. The number of scanners equals the number of addenda of an integral spacing; as a result there is created a cyclic succession of as many pulses as there are counting heads, upon the passage of each single space between two marks in front of any one counting head.

Alternatively, the marks on circle 1 may be visual; they may for instance be in form of opaque graduations on a transparent body. In this case, as shown in FIGURE 2, optical scanning can be effected, with the aid of illuminating means 10 and photosensitive means 11, disposed at mutually opposed portions of a frame 9; such means being provided in each scanning station. While for the purpose of precision scanning more elaborate optics are generally required, it is unnecessary for an understanding of the present invention to show and discuss such added details. Photosensitive means 11, desirably arranged behind suitable slot apertures or the like, yield consecutive impulses in the same way as has been described with respect to FIGURE 1.

The functional noncoincidence or impulse-multiplying effect of scanning stations is achieved, in accordance with the present invention, by angularly spacing said stations by $$\left(a+\frac{b}{n}\right)\Delta S$$

where $n$ is the number of reading stations used; $\Delta S$ is the angular distance between circle graduations; $a$ is an integer which can have different values $m$, $r$, $s$ etc. between different stations; and $b$ is an integer which has consecutive values $1, 2 \ldots n$ between the $n$ stations. For instance, in the illustrated embodiment $n=4$ and accordingly:

$$\Delta \varphi_1 = (m+\frac{1}{4})\Delta S$$

$$\Delta \varphi_2 = (r+\frac{2}{4})\Delta S$$

and $$\Delta \varphi_3 = (s+\frac{3}{4})\Delta S$$

where $\Delta \varphi_1$, $\Delta \varphi_2$ etc. are the angular spaces between stations, indicated on the drawing.

Thus a relatively coarse circle division is functionally converted into a much finer division and by this expedient it becomes possible to reduce the cost of marking circle graduations very materially. The resultant saving far exceeds the added cost due to extra scanning heads, wherever high precision scales are required; and in addition, as already mentioned, still further advantages are obtained in the use of the new system.

In fact, it is often desirable to subdivide the relatively coarse divisions more finely, by added scanning heads. While the four heads are shown as approximately uniformly divided about circle 1, in FIGURE 1, it will be realized that, dependent on the choice of values $n$, $m$, $r$, etc., mentioned above, such arrangement can, if desired, be otherwise than symmetrical relative to the circle, whereby the installation and utilization thereof is further facilitated in many cases.

FIGURE 3 illustrates the consecutive impulses, created by four devices 4, 5, 6 and 7, in form of an approximate diagram of impulse durations and intervals, the first two impulses being identified as $p1$ and $p2$. The horizontal line I represents the base line for consecutive impulses derived from device 7; II represents those of device 4; III represents those of device 5 and IV represents those derived by device 6. As shown the impulses are staggered in time to provide an approximately uniform sequence with time intervals T between consecutive impulses. As already mentioned, diametrical errors and the like are likely to occasion slight variations in consecutive values T1, T2, etc. but such variations are insignificant if and as impulses according to the present invention are counted, not measured in duration or exact spacing.

While enforcement of minimum diametrical and centering errors and the like of course remains important, it will be seen that such requirements become less critical, by virtue of the present invention, than they would be in case of an otherwise similar circle, subdivided in a theoretically finer subdivision.

While in FIGURE 1 the individual counting pulses are shown as forming individual input values of counting circuit 21, FIGURE 4 shows a system wherein such pulses are first collected in a bus conductor 20 feeding them directly or indirectly to the counting circuit.

Reference may now be made to FIGURE 5 wherein a circle 1' is shown as having a set of counting heads 4', 5', 6', 7' associated therewith, at angular distances representing division intervals plus addenda, for instance at 1¼ degrees or 1¼ grades [the circle may be divided into 300 degrees or 400 grades]. The stations 4', etc. are also inwardly displaced, and they cooperate with a division providing what is often described as a nonius system. Such systems have hitherto been used for other purposes and in other ways.

It may be desired, particularly in case of relatively finely subdivided circle divisions, which are to be still more finely subdivided in accordance with the present invention, that the electrical scanning pulses be electronically modulated, prior to actual counting thereof, in a crisper stage 21' [FIGURE 4], reducing the impulse width thereof. The resolving power of the device can be additionally raised by such provision.

It will readily be seen that the invention can be modified in many ways, being applicable also for instance to linear scales, to different counting systems and to different arrangements of movable and stationary parts, as well as to various continuous or intermittent movements, and the like. In case of consecutive, clockwise and counterclockwise rotations, known devices may be used to control the utilization of positive and negative counts which are thus obtained; and a variety of other modifications are possible.

I claim:

1. Apparatus for automatically counting and interpolating between substantially equally spaced division marks of a scale, such as the graduations of a circle, comprising: scanner supporting means mounted for movement relative to the scale; a plurality of scanning devices mounted on the supporting means at distances from one another, each distance equalling a plurality of integral division intervals of the scale plus a fraction of such an interval, to generate a train of impulses in each relative movement of a magnitude corresponding to the distance between two successive dividing marks on the scale; and means for counting the total of the impulses from all of the scanning devices.

2. Apparatus as described in claim 1 wherein the counting means include a single input system, common to the several scanning devices, the scanning devices being coupled in parallel to said single input system.

3. Apparatus for indication of position comprising a scale having equally spaced division indicators, a plurality of sensing means each producing a pulse upon passage of a division indicator, the sensing means being mounted along the scale at distances lying between successive integral multiples of the spacing between division indicators, such multiples being both greater than unity, means for combining the pulses in a single counting channel, and means for counting the total number of pulses from all of the scanning devices, there being $n$ sensing means and the spacing between a first of the sensing means and each of the others being a plurality of integral multiples plus a fraction of the spacing of the division indicators, the fraction being an integral multiple of $1/n$ which is different in each case, so that $n$ equally spaced pulses are produced in each movement corresponding to one spacing between division indicators.

(References on following page)

References Cited in the file of this patent

UNITED STATES PATENTS

| | | |
|---|---|---|
| 2,590,110 | Lippel | Mar. 25, 1952 |
| 2,654,028 | Levy | Sept. 29, 1953 |
| 2,656,106 | Stabler | Oct. 20, 1953 |
| 2,680,241 | Gridley | June 1, 1954 |
| 2,747,797 | Beaumont | May 29, 1956 |
| 2,755,020 | Belcher | July 17, 1956 |
| 2,770,798 | Roth | Nov. 13, 1956 |
| 2,784,397 | Branson | Mar. 5, 1957 |